US008936247B2

(12) United States Patent
Zheng

(10) Patent No.: US 8,936,247 B2
(45) Date of Patent: Jan. 20, 2015

(54) SEAL ASSEMBLY INCLUDING PLATEAU AND CONCAVE PORTION IN MATING SURFACE FOR SEAL TOOTH IN TURBINE

(75) Inventor: Xiaoqing Zheng, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 286 days.

(21) Appl. No.: 12/782,330

(22) Filed: May 18, 2010

(65) Prior Publication Data

US 2011/0285090 A1 Nov. 24, 2011

(51) Int. Cl.

| | |
|---|---|
| ***F16J 15/447*** | (2006.01) |
| ***F01D 11/00*** | (2006.01) |
| ***F01D 5/22*** | (2006.01) |
| ***F01D 11/02*** | (2006.01) |
| ***F01D 11/16*** | (2006.01) |

(52) U.S. Cl.

CPC .............. *F01D 11/001* (2013.01); *F01D 5/225* (2013.01); *F01D 11/02* (2013.01); *F01D 11/025* (2013.01); *F01D 11/16* (2013.01); *F05D 2250/29* (2013.01); *F05D 2250/28* (2013.01); *F05D 2250/293* (2013.01)

USPC ............ 277/412; 277/418; 277/419; 277/420

(58) Field of Classification Search

USPC .......................................... 277/418–420, 412

See application file for complete search history.

(56) References Cited

U.S. PATENT DOCUMENTS 1,610,010 A * 12/1926 Johnson ........................ 415/134
1,857,961 A * 5/1932 Lamb ............................ 277/413
2,123,818 A * 7/1938 Wegmann ..................... 277/419
4,046,388 A * 9/1977 Meyer .......................... 277/418
5,029,876 A * 7/1991 Orlando et al. ............... 277/419
5,395,124 A * 3/1995 Brandon ....................... 277/413
5,464,226 A * 11/1995 Dalton .......................... 277/412
5,599,026 A * 2/1997 Sanders et al. ................ 277/415
5,630,590 A 5/1997 Bouchard et al.
5,810,365 A * 9/1998 Brandon et al. .............. 277/416
6,131,910 A 10/2000 Bagepalli et al.

(Continued)

FOREIGN PATENT DOCUMENTS

EP 0 947 746 A2 10/1999
EP 1 586 742 A2 10/2005

(Continued)

OTHER PUBLICATIONS

European Patent Office, Partial European Search Report for EP Application No. 11166228.4 (EP 11166228) dated Dec. 2, 2013, 5 pages.

*Primary Examiner* — Kristina Fulton
*Assistant Examiner* — Eugene G Byrd
(74) *Attorney, Agent, or Firm* — Ernest G. Cusick; Hoffman Warnick LLC

(57) ABSTRACT

A seal assembly for sealing a stationary component and a rotating component including a seal tooth mating surface for mating with a seal tooth, the seal tooth mating surface including a plateau portion for sealingly receiving the seal tooth during a steady-state operation of the seal assembly and a first concave portion adjacent to the plateau portion for receiving the seal tooth with a clearance during a first non-steady-state operation of the seal assembly, wherein the seal tooth is coupled to one of the stationary component and the rotating component and the seal tooth mating surface is coupled to the other of the stationary component and the rotating component.

17 Claims, 10 Drawing Sheets

(56) References Cited

U.S. PATENT DOCUMENTS

| | | | | |
|---|---|---|---|---|
| 6,139,019 | A * | 10/2000 | Dinc et al. | 277/355 |
| 6,220,603 | B1 * | 4/2001 | Brandon et al. | 277/419 |
| 6,250,640 | B1 | 6/2001 | Wolfe et al. | |
| 6,406,253 | B2 * | 6/2002 | Heyes | 415/111 |
| 6,840,519 | B2 | 1/2005 | Dinc et al. | |
| 6,854,736 | B2 | 2/2005 | Paprotna | |
| 7,549,834 | B2 | 6/2009 | Kirchhof et al. | |
| 7,641,200 | B2 * | 1/2010 | Chevrette | 277/303 |
| 2002/0190474 | A1 * | 12/2002 | Turnquist et al. | 277/355 |
| 2003/0223872 | A1 | 12/2003 | Frolov et al. | |
| 2004/0000759 | A1 | 1/2004 | Turnquist et al. | |
| 2004/0036227 | A1 | 2/2004 | Sarshar et al. | |
| 2005/0194745 | A1 | 9/2005 | Hogg | |
| 2005/0271499 | A1 | 12/2005 | Loy et al. | |
| 2007/0071597 | A1 | 3/2007 | Montgomery | |
| 2007/0257445 | A1 | 11/2007 | Mortzheim et al. | |
| 2008/0169616 | A1 | 7/2008 | Awtar et al. | |

FOREIGN PATENT DOCUMENTS

| | | | |
|---|---|---|---|
| EP | 1 607 583 | A1 | 12/2005 |
| EP | 0 816 726 | B1 | 9/2006 |
| EP | 1 169 586 | B1 | 2/2007 |
| EP | 1 870 564 | A2 | 12/2007 |
| GB | 2 393 766 | A | 4/2004 |
| GB | 2 407 346 | A | 4/2005 |
| GB | 2 411 931 | A | 9/2005 |

* cited by examiner

SEAL ASSEMBLY INCLUDING PLATEAU AND CONCAVE PORTION IN MATING SURFACE FOR SEAL TOOTH IN TURBINE

BACKGROUND OF THE INVENTION

The subject matter disclosed herein relates generally to seal assemblies between rotating and stationary components of machines and, more particularly, to seal teeth mating surfaces for receiving seal teeth in a turbine during different phases of turbine operation.

As used throughout this application, reference to machine is to include machines having rotating and stationary components, including, for example, a steam turbine, a gas turbine or a compressor.

In a machine, a seal assembly between rotating and stationary components is an important part of machine performance. A seal assembly may be comprised of a seal tooth and a mating surface. For example, in a steam turbine, it will be appreciated that the greater the number and magnitude of steam leakage paths, the greater the losses of efficiency of the steam turbine. In a main flow path of a steam turbine, a plurality of stages are used to efficiently extract energy from the high-pressure and high-temperature fluid flow to drive an electrical generator. In each stage, there is a row of stationary blades (nozzles) and a row of rotating blades (buckets). Clearances are needed between the nozzles and a rotor and between the buckets and a casing. Improving the seal assemblies and reducing steam leakage paths improves steam turbine efficiency.

FIG. 1 shows a partial side cross-sectional view of a known machine 100. In machine 100, a rotor 102 is surrounded by a casing 104. Rotor 102 is attached to a thrust bearing 103 (shown schematically). Rotating components 107 of machine 100 may be include rotor 102 and radially extending rotating components 106. Stationary components 109 may include casing 104 and radially extending stationary components 108. Casing 104 and rotor 102 may have different thermal properties. For example, casing 104 and rotor 102 may have different thermal masses. Differing thermal masses may be due to differing relative sizes or composition of differing materials.

For example, in a steam turbine, the thermal mass of rotor 102 is relatively small compared with that of casing 104. Prior to start up, the rotor 102 and casing 104 are in a cold assembly position. During a shut-down or temperature increasing of steam turbine, rotor 102 heats up and expands faster than casing 104. As a result, rotor 102 changes position relative to casing 104. For example, rotor 102 moves in an axial direction away 110 from thrust bearing 103 relative to casing 104. As casing 104 and rotor 102 approach a same temperature, rotor 102 returns to approximately its cold assembly position relative to casing 104 until the parts reach the same temperature, at which point steam turbine reaches a steady-state. In steady-state, relative position of rotor 102 to casing 104 remains substantially the same if the rotor and casing are made of the same materials or materials with similar thermal expansion rates. During a shut-down or temperature decreasing of steam turbine, rotor 102 cools faster than casing 104 and rotor 102 changes position relative to casing 104 in the opposite direction as during shut-down or temperature increasing. For example, rotor 102 moves in an axial direction towards 112 thrust bearing 103 relative to casing 104. In addition to axial movement, rotor 102 may move in a radial direction 114 due to vibration during shut-down or temperature increasing and shut-down or temperature decreasing or temperature decreasing. A person skilled in the art will readily recognize that in a machine 100 the relative movement of rotor 102 to casing 104 will depend upon the differing thermal properties. For example, if rotor 102 is relatively large in thermal mass compared to casing 104, rotor 102 would heat slower than casing 104 during shut-down or temperature increasing.

Seal teeth 116 may be placed on rotor 102, radially extending rotating components 106, casing 104, or radially extending stationary components 108. FIG. 2 shows a partial side cross sectional view of a known machine 100 including a radially extending rotating component 106, seal tooth 116, casing 104, and seal tooth mating surface 122. Seal tooth 116 may be received by a seal tooth mating surface 122 on casing 104, rotor 102, radially extending rotating component 106, or radially extending stationary component 108 depending upon seal tooth 116 placement. A seal assembly 123 is comprised of seal tooth 116 and seal tooth mating surface 122. Seal assembly 123 may include HiLo, interlocking, and straight-through configurations. During shut-down or temperature increasing or shut-down or temperature decreasing, seal tooth 116 may contact seal tooth mating surface 122 causing damage to seal tooth 116, to seal tooth mating surface 122, or both seal tooth 116 and seal tooth mating surface 122. Wearing of seal tooth 116, seal tooth mating surface 122, or both seal tooth 116 and seal tooth mating surface 122 may cause leakage increase particularly upon reaching steady-state operation.

Seal tooth 116 may include a brush seal. During shut-down or temperature increasing or shut-down or temperature decreasing, the tip of brush seal may have too much interference with seal tooth mating surface causing the brush seal tip to wear. Wearing of brush seal tip may cause more leakage particularly upon reaching steady-state operation.

BRIEF DESCRIPTION OF THE INVENTION

A first aspect of the disclosure provides a seal assembly for sealing a stationary component and a rotating component, the seal assembly comprising: a seal tooth mating surface for mating with a seal tooth, the seal tooth mating surface including: a plateau portion for sealingly receiving the seal tooth during a steady-state operation of the seal assembly and a first concave portion adjacent to the plateau portion for receiving the seal tooth with a clearance during a first non-steady-state operation of the seal assembly, wherein the seal tooth is coupled to one of the stationary component and the rotating component and the seal tooth mating surface is coupled to the other of the stationary component and the rotating component.

A second aspect of the disclosure provides a turbine, comprising: a seal assembly for sealing a stationary component and a rotating component, the seal assembly comprising: a seal tooth mating surface for mating with a seal tooth, the seal tooth mating surface including: a plateau portion for sealingly receiving the seal tooth during a steady-state operation of the seal assembly and a first concave portion adjacent to the plateau portion for receiving the seal tooth with a clearance during a first non-steady-state operation of the seal assembly, and wherein the seal tooth is coupled to one of the stationary component and the rotating component and the seal tooth mating surface is coupled to the other of the stationary component and the rotating component.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above aspects of the invention provide improved operation, performance and efficiency of a machine. As used throughout this application, reference to machine is to include machines having rotating and stationary components, including, for example, a steam turbine, a gas turbine or a compressor.

Figure 1:
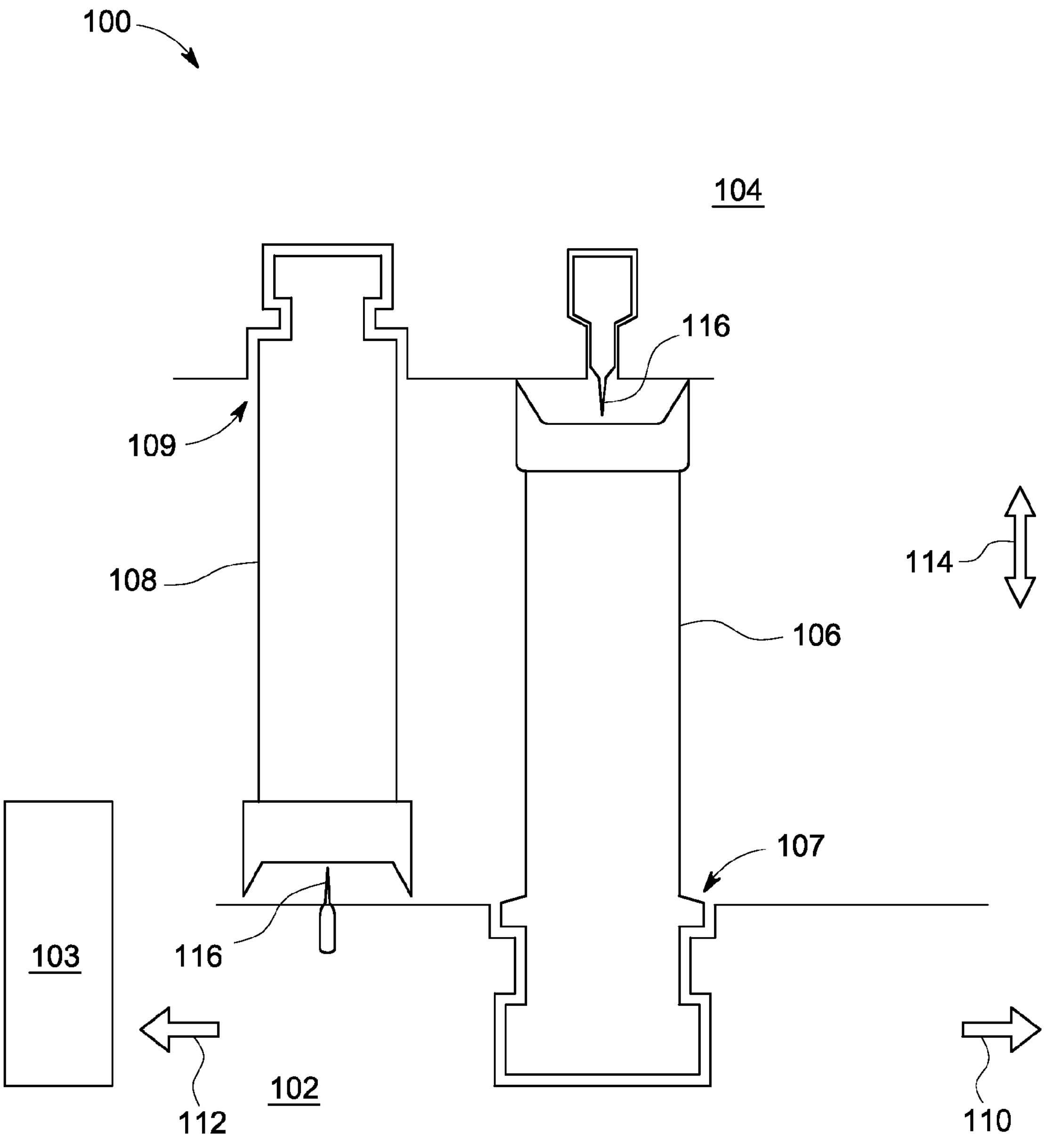
FIG. 1 (PRIOR ART)
FIG. 1 is a partial side cross-sectional view of a known machine.
Figure 2:
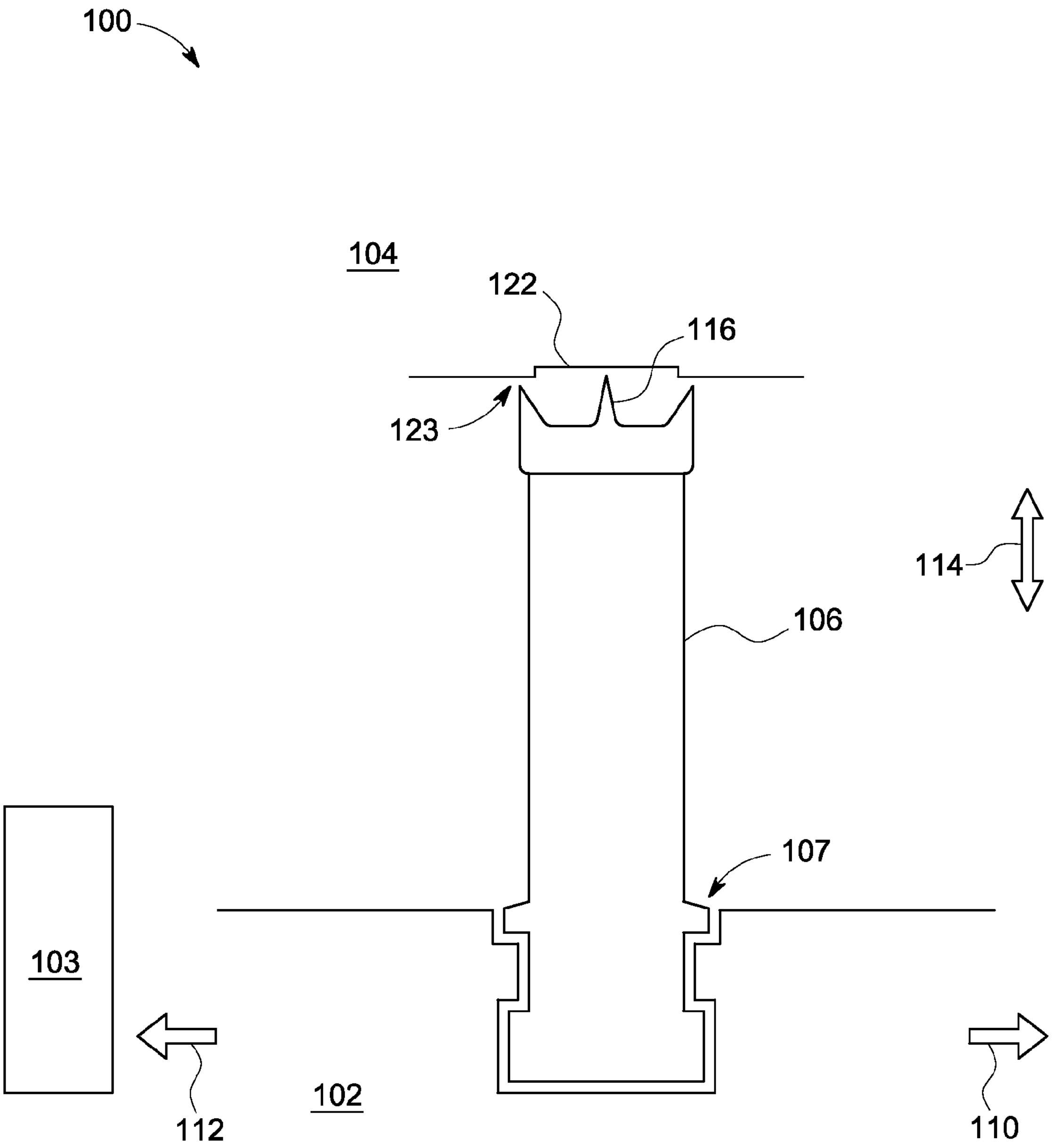
FIG. 2 (PRIOR ART)
FIG. 2 is a partial side cross-sectional view of a known machine.
Figure 3:
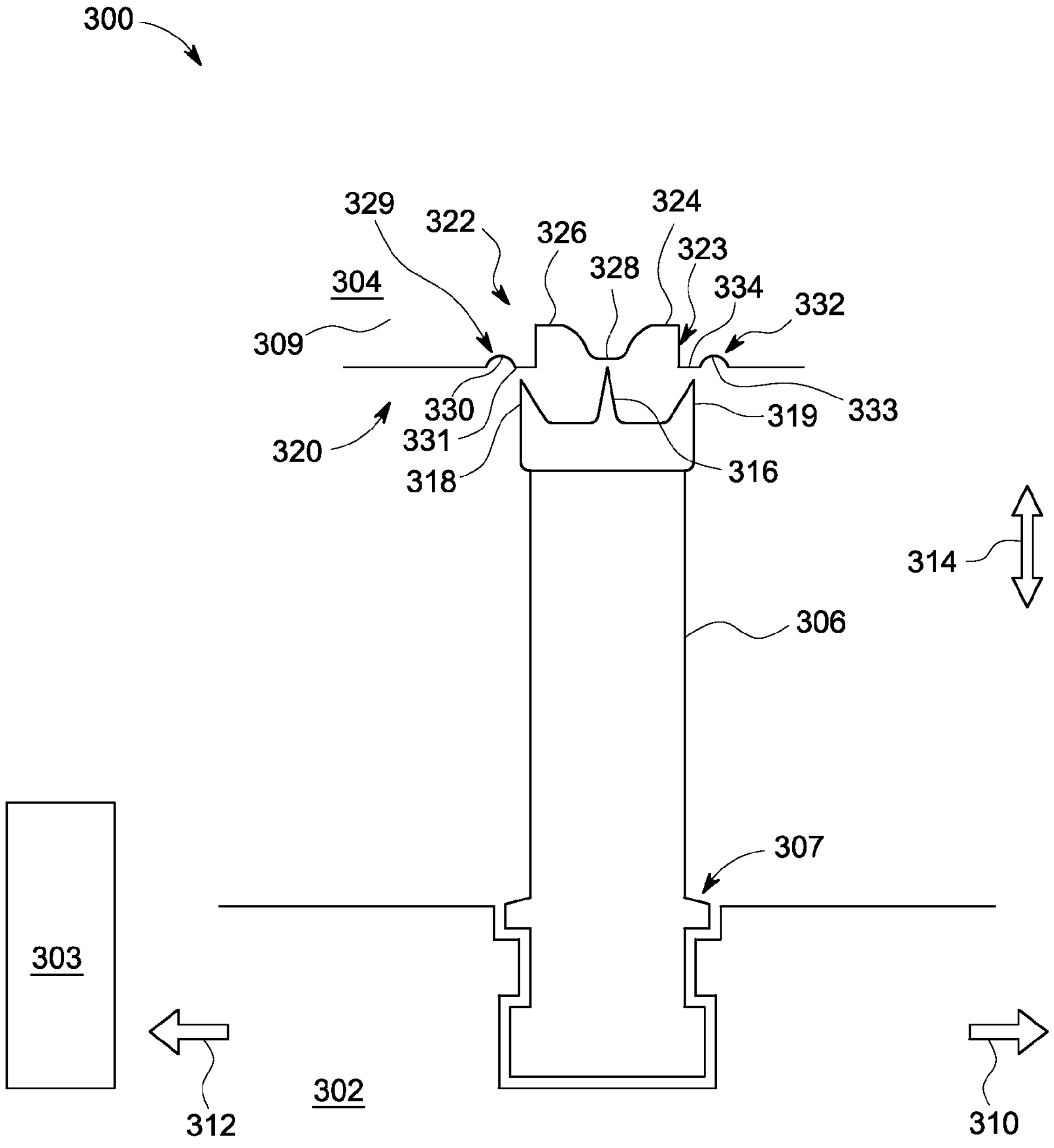
FIG. 3 is a partial side cross-sectional view of one embodiment of the invention including a machine with a seal assembly.

FIG. 3 shows a partial side cross-sectional view of one embodiment of the invention including a machine 300, e.g., a turbine, with a seal assembly 323. Machine 300 may include a rotating component 307 and stationary component 309. As shown, rotating component 307 may include a rotor 302 and/or a radially extending rotating component 306. At least one seal tooth 316 may be coupled to radially extending rotating component 306. As shown, a stationary component 309 may include a casing 304 or a part thereof. Casing 304 is shown having at least one seal tooth mating surface 322 along an inner surface 320 of casing 304 for receiving seal tooth 316. Each seal tooth mating surface 322 may include a first concave portion 324 configured to receive a seal tooth 316 with a non-steady-state clearance during a first non-steady-state operation, e.g., a shut-down or temperature increasing, of machine 300. First concave portion 324 is concavely shaped relative to an inner surface 320 of casing 304 and relative to seal tooth 316. First concave portion 324 may include any concave shape. In one embodiment, seal tooth mating surface 322 may include a second concave portion 326 configured to receive the seal tooth 316 with non-steady-state clearance during a second non-steady-state operation, e.g., a shut-down or temperature decreasing, of machine 300. Second concave portion 326 is concavely shaped relative to an inner surface 320 of casing 304 and relative to seal tooth 316. Second concave portion 326 may include any concave shape. Each seal tooth mating surface 322 may also include a plateau portion 328 configured to sealingly receive seal tooth 316 with a steady-state clearance during a steady-state operation of machine 300. First concave portion 324 may be adjacent to plateau portion 328 in axial direction away 310 from thrust bearing 303 and a second concave portion 326 may be adjacent to plateau portion 328 in axial direction towards 312 thrust bearing 303.

In an alternative embodiment, casing 304 may also include a first ancillary seal tooth mating surface 329 and a second ancillary seal tooth mating surface 332. Other embodiments may include a single ancillary seal tooth mating surface or more than two ancillary seal tooth mating surfaces. First ancillary seal tooth mating surface 329 may include a first ancillary concave portion 330 for receiving the first ancillary seal tooth 318 during the first non-steady-state operation, e.g., a shut-down or temperature increasing, of machine 300. Second ancillary seal tooth mating surface 332 may include a second ancillary concave portion 333 for receiving the second ancillary seal tooth 318 during the second non-steady-state operation, e.g., a shut-down or temperature decreasing, of machine 300. First ancillary concave portion 330 and second ancillary concave portion 333 may be concavely shaped relative to inner surface 320 of casing 304 and relative to respective ancillary seal teeth 318, 319. Either or both ancillary concave portions 330, 333 may also include any concave shape. First ancillary seal tooth mating surface 329 may include a first ancillary plateau portion 331 for receiving first ancillary seal tooth 318 during steady-state operation of machine 300. Similarly, second ancillary seal tooth mating surface 332 may include a second ancillary plateau portion 334 for receiving the second ancillary seal tooth 318 during steady-state operation of machine 300. Other embodiments may include more than two ancillary seal teeth. First ancillary seal tooth 318 may be adjacent to seal tooth 316 and second ancillary seal tooth 319 may be adjacent to seal tooth 316 and opposite first ancillary seal tooth 318.

Radially extending rotating component 306 with seal tooth 316 may include, for example, a bucket and a bucket cover. Seal tooth 316 and either or both ancillary seal teeth 318, 319 may include, for example, a caulked J-strip, a steel strip, a machined integral tooth, an inserted tooth seal, and a brush seal. Plateau portion 328 may include configuration for steady-state clearance between seal tooth mating surface 322 and a seal tooth 316. "Steady-state clearance" is sufficient clearance to substantially avoid rubbing between each seal tooth 316 and seal tooth mating surface 322 during steady-state operation of machine 300. For example, steady-state clearance as used herein and throughout the specification may range from approximately 0.127 cm to approximately 1.270 cm. First concave portion 324 of seal tooth mating surface 322 may have any profile that permits any clearance between seal tooth 316 and seal tooth mating surface 322 or may be configured for a non-steady-state clearance throughout first non-steady-state operation, e.g., a shut-down or temperature increasing, of machine 300. Second concave portion 326 of seal tooth mating surface 322 may have any profile that permits any clearance between seal tooth 316 and seal tooth mating surface 322 or may be configured for non-steady-state clearance throughout second non-steady-state operation, e.g., a shut-down or temperature decreasing, of machine 300. "Non-steady-state clearance" may include: sufficient clearance to substantially avoid rubbing between seal tooth 316 and first concave portion 324 during first non-steady-state operation, e.g., a shut-down or temperature increasing, of machine 300; and sufficient clearance to substantially avoid rubbing between seal tooth 316 and second concave portion 326 during second non-steady-state operation, e.g., a shut-down or temperature decreasing, of machine 300. For example, non-steady-state clearance as used herein and throughout the specification may range from approximately 0.381 cm to approximately 2.032 cm.

Figure 4:
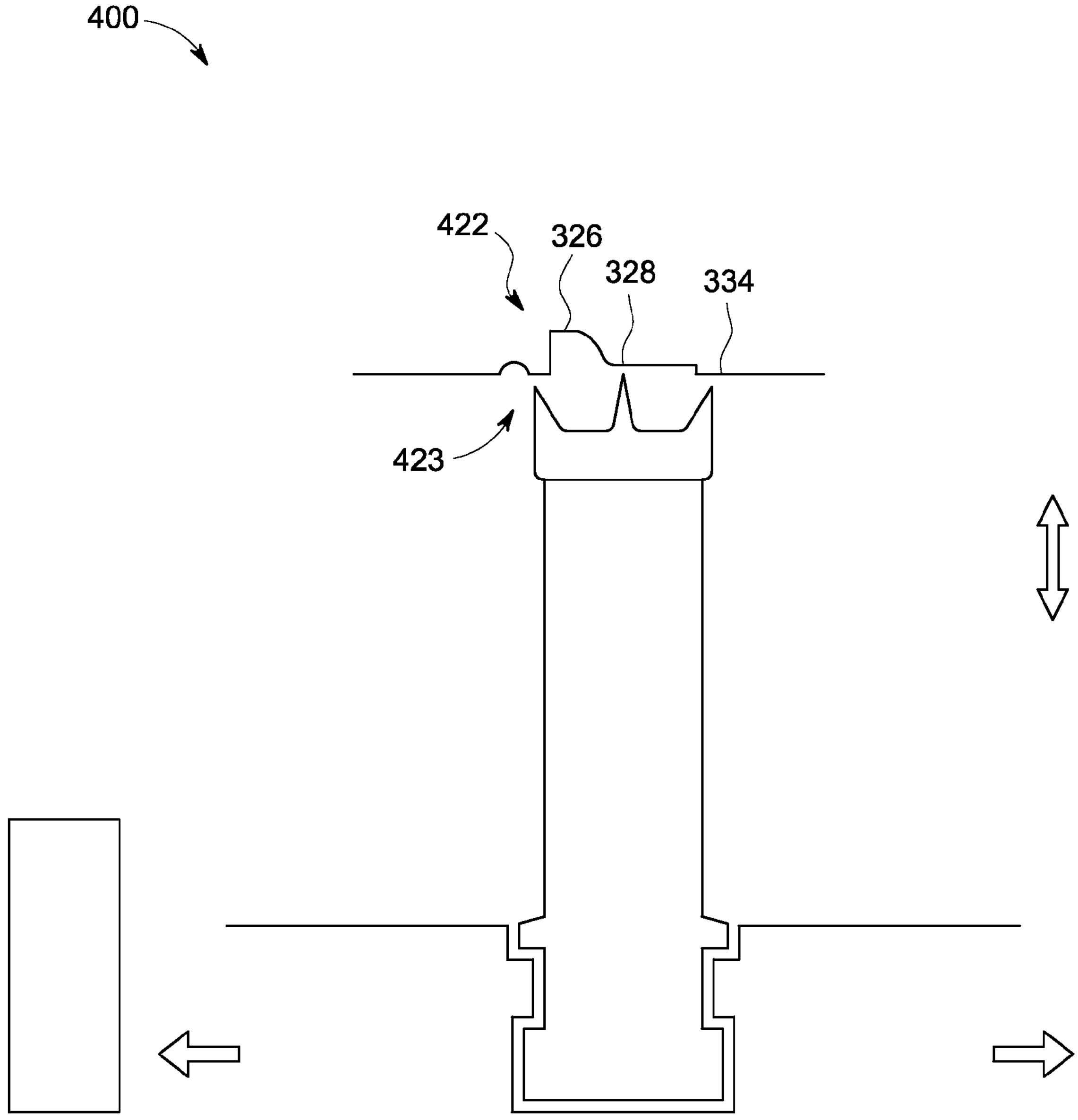
FIG. 4 is a partial side cross-sectional view of one embodiment of the invention including a machine with a seal assembly.

FIG. 4 shows a partial side cross-sectional view of one embodiment of the invention including machine 400 with seal assembly 423. In one embodiment, first concave portion 324 (FIG. 3) and first ancillary concave portion 333 (FIG. 3) are removed and the respective plateau portions 328, 334 extend away from second concave portion 326. FIG. 4 is otherwise identical to the embodiment of the invention shown in FIG. 3.

Figure 5:
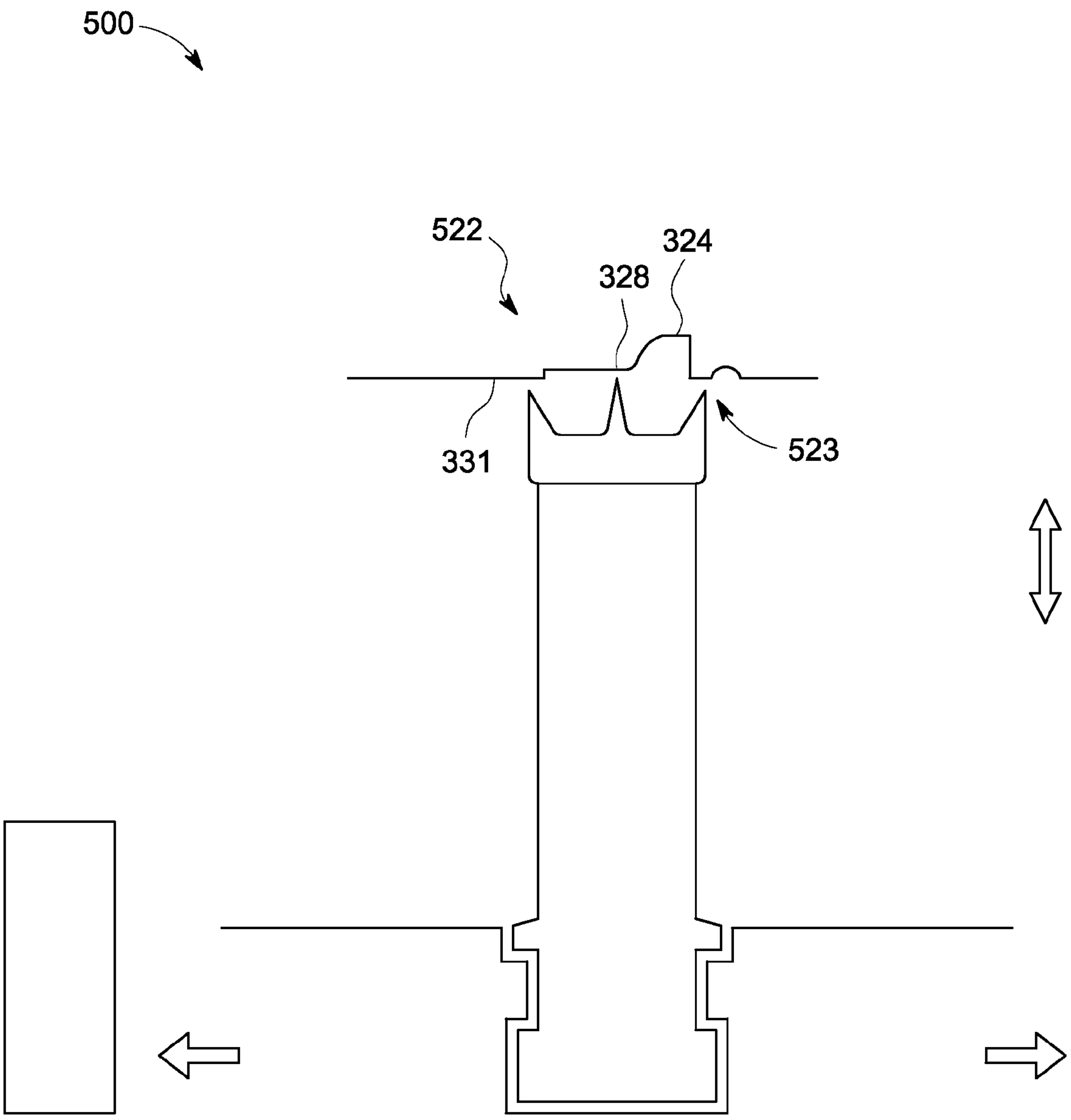
FIG. 5 is a partial side cross-sectional view of one embodiment of the invention including a machine with a seal assembly.

FIG. 5 shows a partial side cross-sectional view of one embodiment of the invention including machine 500 with seal assembly 523. In one embodiment, second concave portion 326 (FIG. 3) and second ancillary concave portion 330 (FIG. 3) are removed and the respective plateau portions 328, 331 extend away from the first concave portion 324. FIG. 5 is otherwise identical to the embodiment of the invention shown in FIG. 3. A person skilled in the art will readily recognize that any of the illustrated seal tooth mating surfaces described herein may include the alternative embodiments of seal tooth mating surfaces 422, 522 depicted in FIG. 4 and FIG. 5.

Figure 6:
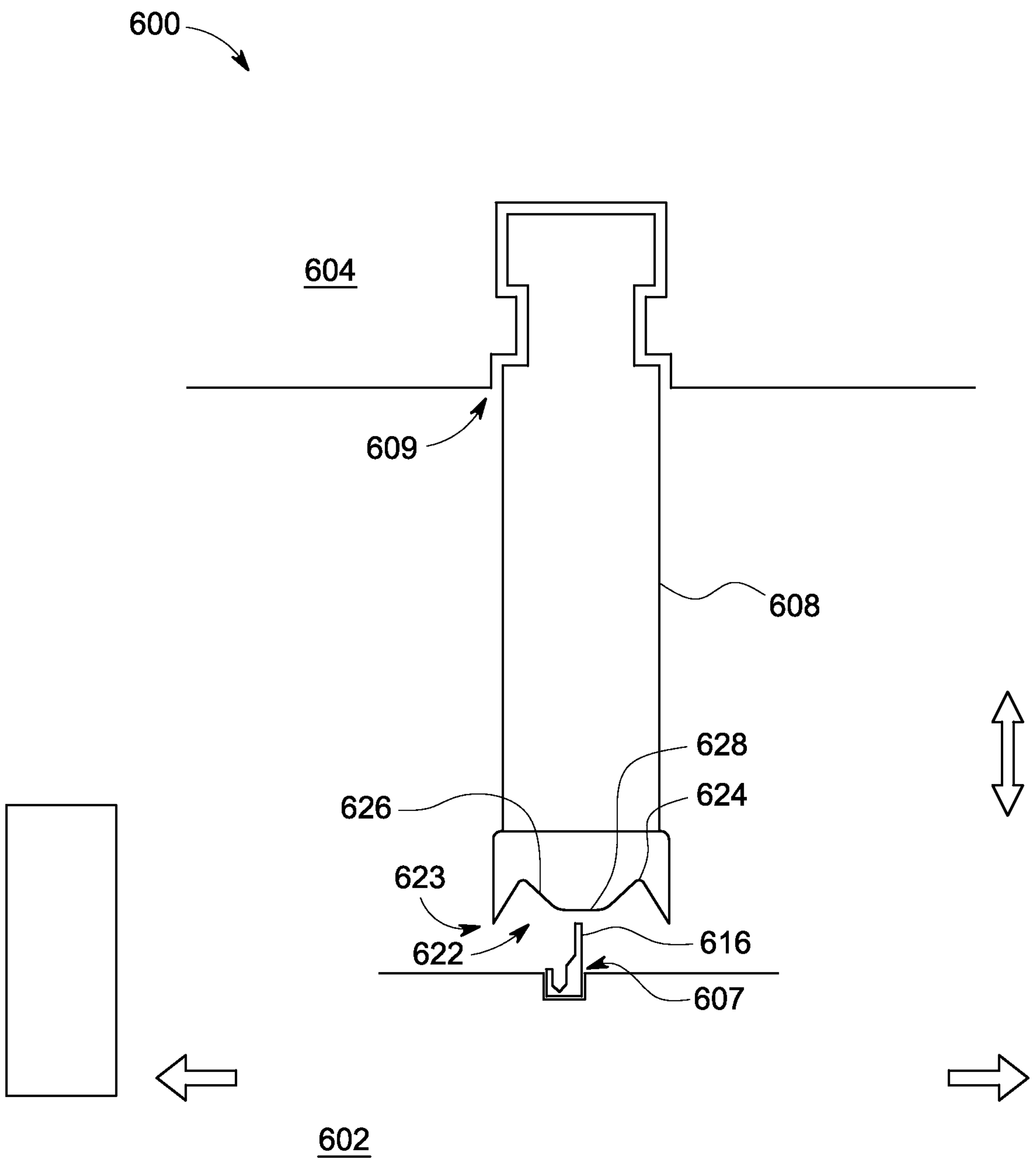
FIG. 6 is a partial side cross-sectional view of one embodiment of the invention including a machine with a seal assembly.

FIG. 6 shows a partial side cross-sectional view of one embodiment of the invention including machine 600 with seal assembly 623. Machine may include stationary component(s) 609 and rotating component(s) 607. As shown, rotating component 607 may include rotor 602 and seal tooth 616. Seal tooth 616 may be coupled to rotor 602 and radially extending from rotor 602. Stationary component 609 may include casing 604 and a plurality of radially extending stationary components 608, each radially extending stationary component 608 having at least one seal tooth mating surface 622 for receiving seal tooth 616. Radially extending stationary component 608 may include, for example, a nozzle, a nozzle cover, and/or an end packing ring. Each seal tooth mating surface 622 may include a first concave portion 624 configured to receive seal tooth 616 with non-steady-state clearance during the first non-steady-state operation, e.g., a shut-down or temperature increasing, of machine 600. Each seal tooth mating surface 622 may include a second concave portion 626 configured to receive seal tooth 616 with non-steady-state clearance during a second non-steady-state operation, e.g., a shut-down or temperature decreasing, of machine 600. In addition, each seal tooth mating surface 622 may include a plateau portion 628 configured to sealingly receive at least one seal tooth 616 with steady-state clearance during a steady-state operation of machine 600. As noted above, any or all portions of seal tooth mating surface 622 may be configured to receive seal tooth 616 with non-steady-state clearance and steady-state clearance.

Figure 7:
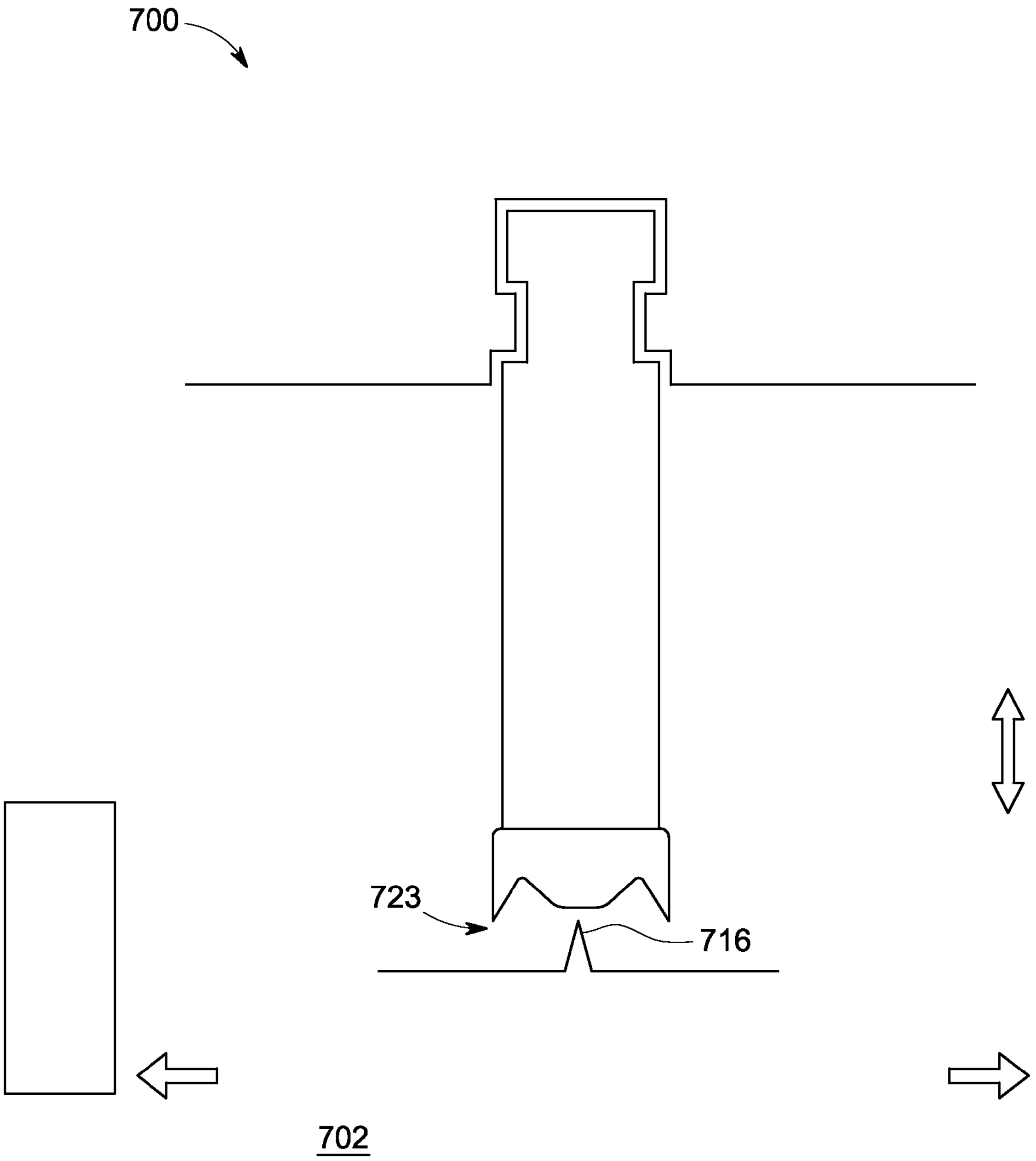
FIG. 7 is a partial side cross-sectional view of one embodiment of the invention including a machine with a seal assembly.

FIG. 7 shows a partial side cross-sectional view of one embodiment of the invention including machine 700 with seal assembly 723. FIG. 7 shows at least one seal tooth 716 as an integral part of rotor 702 and is otherwise identical to the embodiment of the invention shown in FIG. 6.

Figure 8:
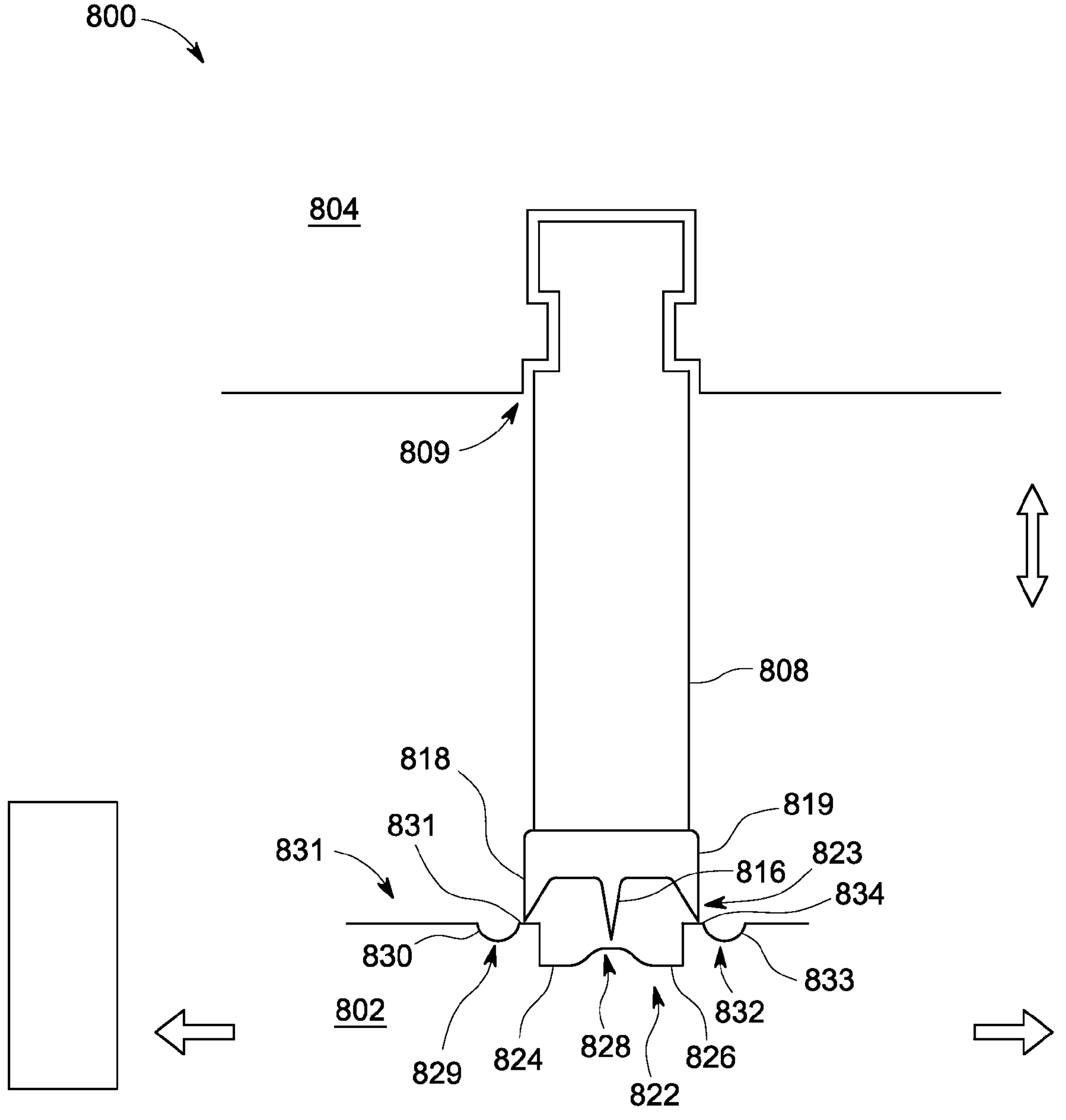
FIG. 8 is a partial side cross-sectional view of one embodiment of the invention including a machine with a seal assembly.

FIG. 8 shows a partial side cross-sectional view of one embodiment of the invention including machine 800 with seal assembly 823. Machine 800 may include radially extending stationary component 808 with at least one seal tooth 816. Rotor 802 is shown having at least one seal tooth mating surface 822 along an outer surface 831 for receiving seal tooth 816. Each seal tooth mating surface 822 may include first concave portion 824 configured to receive seal tooth 816 with non-steady-state clearance during first non-steady-state operation, e.g., a shut-down or temperature increasing, of machine 800. Each seal tooth mating surface 822 may include second concave portion 826 configured to receive seal tooth 816 with non-steady-state clearance during second non-steady-state operation, e.g., a shut-down or temperature decreasing, of machine 800. Each seal tooth mating surface 822 may include plateau portion 828 configured to sealingly receive seal tooth 816 with steady-state clearance during steady-state operation of machine 800.

In an alternative embodiment, rotor 802 may include a first ancillary seal tooth mating surface 829 and a second ancillary seal tooth mating surface 832. Other embodiments may include a single ancillary seal tooth mating surface or more than two ancillary seal tooth mating surfaces. First ancillary seal tooth mating surface 829 include a first ancillary concave portion 830 for receiving first ancillary seal tooth 818 during first non-steady-state operation, e.g., a shut-down or temperature increasing, of machine 800. Second ancillary seal tooth mating surface 832 include a second ancillary concave portion 833 for receiving second ancillary seal tooth 819 during second non-steady-state operation, e.g., a shut-down or temperature decreasing, of machine 800. First ancillary concave portion 830 and second ancillary concave portion 833 may be concavely shaped relative to outer surface 831 of rotor 802 and relative to respective ancillary seal teeth 818, 819. Either or both ancillary concave portions 830, 833 may include any concave shape. First ancillary seal tooth mating surface 829 may also include a first ancillary plateau portion 831 for receiving the first ancillary seal tooth 818 during steady-state operation of machine 800. Second ancillary seal tooth mating surface 832 may include a second ancillary plateau portion 834 for receiving the second ancillary seal tooth 818 during steady-state operation of machine 800. Other embodiments may include more than two ancillary seal teeth. First ancillary seal tooth 818 may be adjacent to seal tooth 816. Second ancillary seal tooth 819 may be adjacent to seal tooth 816 and opposite first ancillary seal tooth 818.

Radially extending stationary component 808 with seal tooth 816 may include, for example, a nozzle, nozzle cover, and end packing ring. Each seal tooth 816 and first and second ancillary seal teeth 818, 819 may include, for example, a caulked J-strip, a steel strip, a machined integral tooth, an inserted tooth seal, and a brush seal. Plateau portion 828 of seal tooth mating surface 822 may include configuration for steady-state clearance between seal tooth mating surface 822 and at seal tooth 816. First concave portion 824 of seal tooth mating surface 822 may have any profile that permits any clearance between seal tooth 816 and seal tooth mating surface 822 or may be configured for non-steady-state clearance throughout first non-steady-state operation, e.g., a shut-down or temperature increasing, of machine 800. Second concave portion 826 of seal tooth mating surface 822 may have any profile that permits any clearance between seal tooth 816 and seal tooth mating surface 822 or may be configured for non-steady-state clearance throughout second non-steady-state operation, e.g., a shut-down or temperature decreasing, of machine 800.

Figure 9:
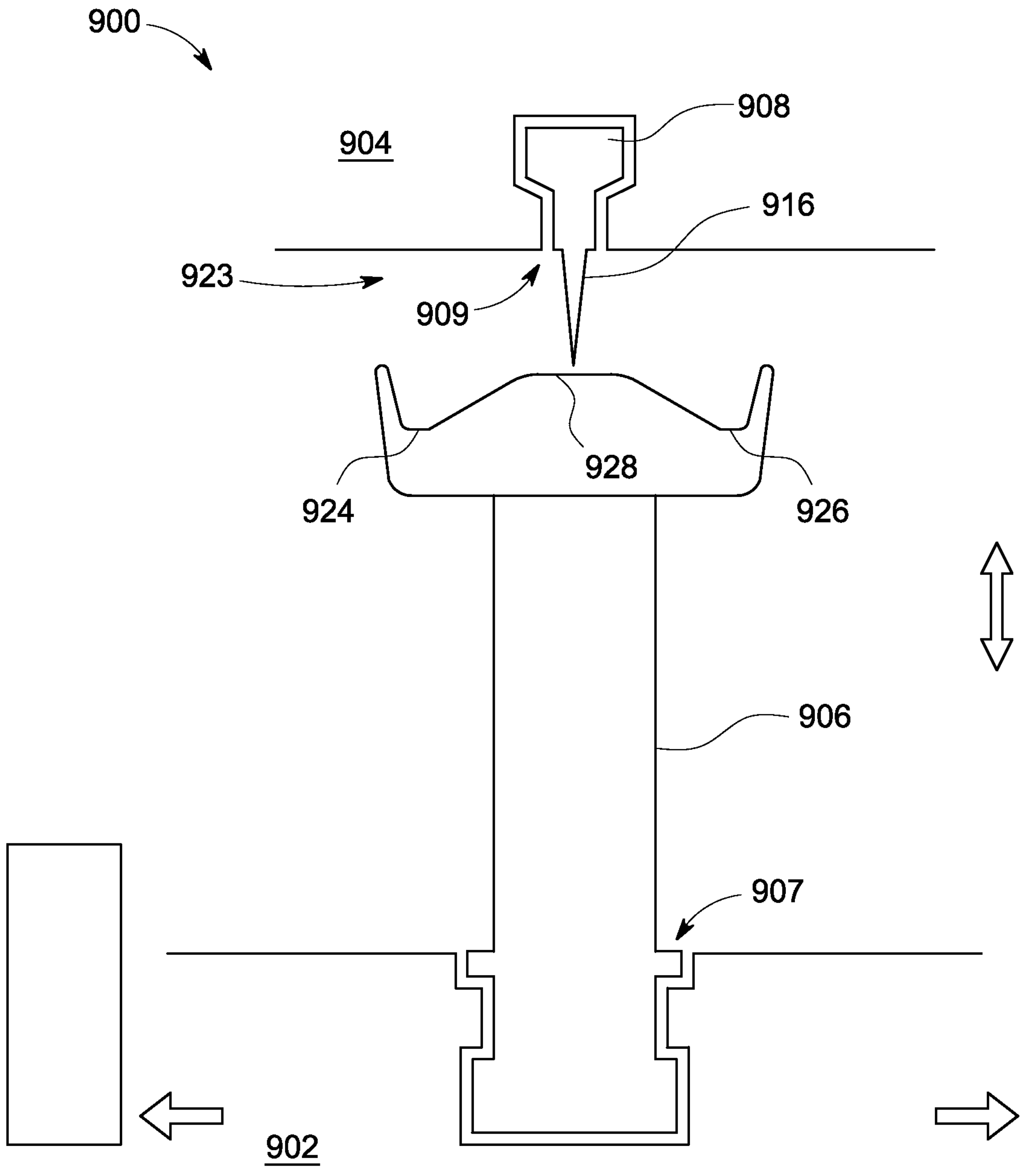
FIG. 9 is a partial side cross-sectional view of one embodiment of the invention including a machine with a seal assembly.

FIG. 9 shows a partial side cross-sectional view of one embodiment of the invention including machine 900 with seal assembly 923. Machine 900 may include rotating component(s) 907 and stationary component(s) 909. Stationary component(s) 909 may include casing 904 and at least one seal tooth 916. Seal tooth 916 is shown attached to casing 904 and radially extending from casing 904. Rotor 902 may have a plurality of radially extending rotating components 906, each radially extending rotating component 906 having seal tooth mating surface 922 for receiving seal tooth 916. Radially extending rotating components 906 may include, for example, buckets and bucket covers. Each seal tooth mating surface 922 may include first concave portion 924 configured to receive seal tooth 916 with a non-steady-state clearance during first non-steady-state operation, e.g., a shut-down or temperature increasing, of machine 900. Similarly, each seal tooth mating surface 922 may include second concave portion 926 configured to receive seal tooth 916 with a non-steady-state clearance during second non-steady-state operation, e.g., a shut-down or temperature decreasing, of machine 900. Each seal tooth mating surface 922 may include plateau portion 928 configured to sealingly receive seal tooth 916 with a steady-state clearance during steady-state operation of machine 900. As noted above, any or all portions of seal tooth mating surface 922 may be configured to receive seal tooth 916 with non-steady-state clearance and steady-state clearance.

Figure 10:
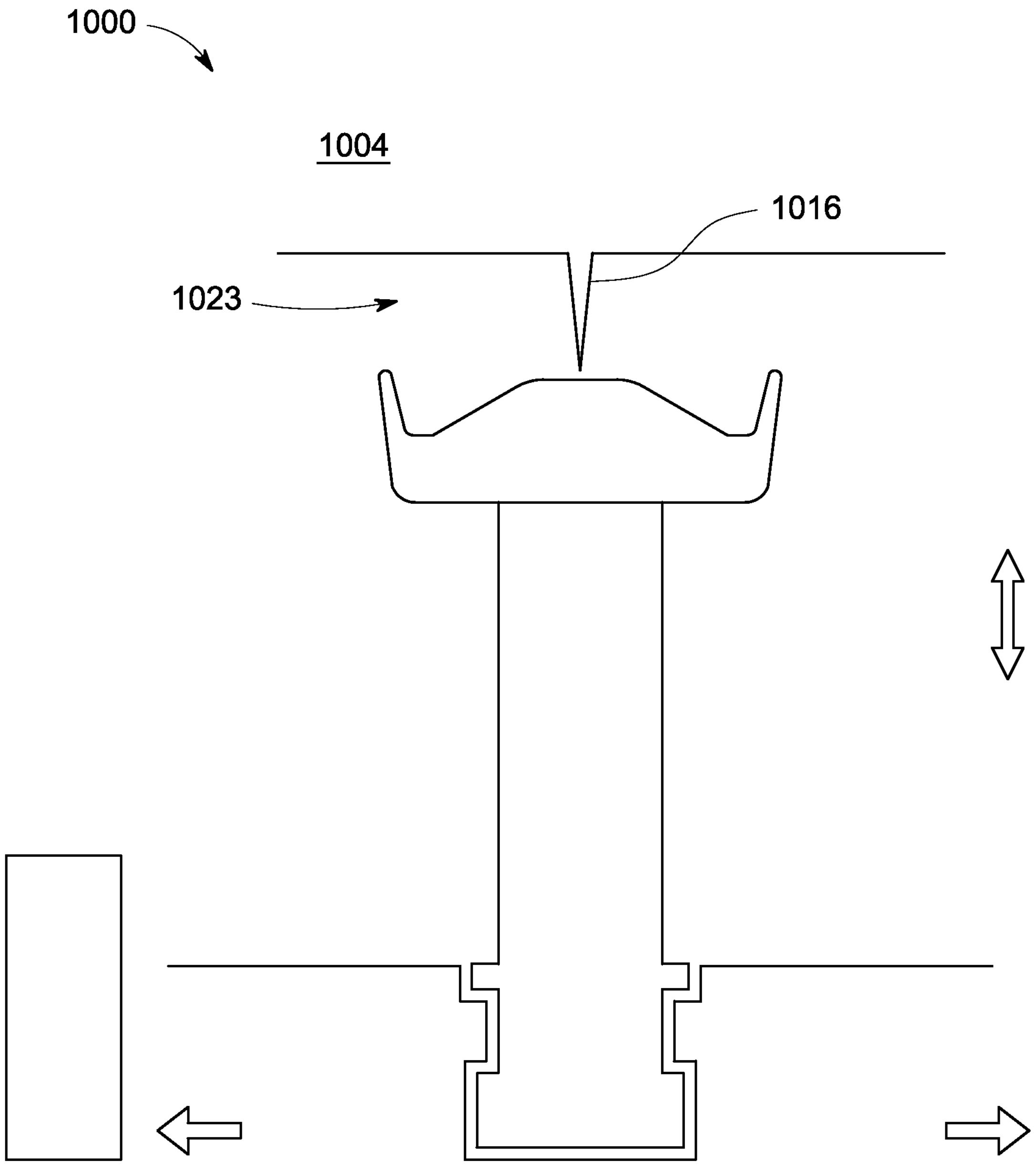
FIG. 10 is a partial side cross-sectional view of one embodiment of the invention including a machine with a seal assembly.

FIG. 10 shows a partial side cross-sectional view of one embodiment of the invention including machine 1000 with seal assembly 1023. FIG. 10 shows at least one seal tooth 1016 as an integral part of casing 1004 and is otherwise identical to the embodiment of the invention shown in FIG. 9.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seal assembly for sealing a stationary component and a rotating component, the seal assembly comprising:
- a plurality of seal tooth mating surfaces for each surface mating with one of a plurality of seal teeth, each seal tooth mating surface including:
  - a plateau portion for sealingly receiving one of the plurality of seal teeth during a steady-state operation of the seal assembly and a first concave portion adjacent to the plateau portion for receiving the received seal tooth with a clearance during a first non-steady-state operation of the seal assembly,
  - wherein the received seal tooth is coupled to one of the stationary component and the rotating component and the seal tooth mating surface is coupled to the other of the stationary component and the rotating component; and
  - a second concave portion adjacent to the plateau portion opposite the first concave portion, the second concave portion for receiving the received seal tooth with a clearance during a second non-steady-state operation of the seal assembly.

2. The seal assembly of claim 1, wherein the first non-steady-state operation includes one of shut-down or temperature increasing and shut-down or temperature decreasing and the second non-steady-state operation of the seal assembly includes one of the other of shut-down or temperature increasing and shut-down or temperature decreasing.

3. The seal assembly of claim 1, wherein the rotating component includes a plurality of radially extending buckets, each bucket including the seal tooth mating surface or the received seal tooth thereon.

4. The seal assembly of claim 1, wherein the stationary component includes a plurality of radially extending nozzles, each nozzle including the seal tooth mating surface or the seal tooth thereon.

5. The seal assembly of claim 1, wherein the stationary component includes a plurality of radially extending end packing rings, each end packing ring including the seal tooth mating surface or the seal tooth thereon.

6. The seal assembly of claim 1, wherein the received seal tooth is annularly coupled to the one of the stationary component and the rotating component.

7. The seal assembly of claim 1 further comprising:
- a first ancillary seal tooth adjacent to the received seal tooth; and
- a first ancillary seal tooth mating surface including a first ancillary concave portion for receiving the first ancillary seal tooth with a clearance during the first non-steady-state operation of the seal assembly and a first ancillary plateau portion for receiving the first ancillary seal tooth with a clearance during the steady-state operation of the seal assembly.

8. The seal assembly of claim 7 further comprising:
- a second ancillary seal tooth adjacent to the received seal tooth and opposite the first ancillary seal tooth; and
- a second ancillary seal tooth mating surface including a second ancillary concave portion for receiving the second ancillary seal tooth with a clearance during the second non-steady-state operation of the seal assembly and a second ancillary plateau portion for receiving the second ancillary seal tooth with a clearance during the steady-state operation of the seal assembly.

9. A turbine, comprising:
- a seal assembly for sealing a stationary component and a rotating component, the seal assembly comprising:
- a plurality of seal tooth mating surfaces for each surface mating with one of a plurality of seal teeth, each seal tooth mating surface including:
  - a plateau portion for sealingly receiving one of the plurality of seal teeth during a steady-state operation of the seal assembly and a first concave portion adjacent to the plateau portion for receiving the received seal tooth with a clearance during a first non-steady-state operation of the seal assembly,
  - wherein the received seal tooth is coupled to one of the stationary component and the rotating component and the seal tooth mating surface is coupled to the other of the stationary component and the rotating component;

a second concave portion adjacent to the plateau portion opposite the first concave portion, the second concave portion for receiving the received seal tooth with a clearance during a second non-steady-state operation of the seal assembly;

a first ancillary seal tooth adjacent to the received seal tooth;

a first ancillary seal tooth mating surface including a first ancillary concave portion for receiving the first ancillary seal tooth with a clearance during the first non-steady-state operation of the seal assembly and a first ancillary plateau portion for receiving the first ancillary seal tooth with a clearance during the steady-state operation of the seal assembly;

a second ancillary seal tooth adjacent to the received seal tooth and opposite the first ancillary seal tooth; and a second ancillary seal tooth mating surface including a second ancillary concave portion for receiving the second ancillary seal tooth with a clearance during the second non-steady-state operation of the seal assembly and a second ancillary plateau portion for receiving the second ancillary seal tooth with a clearance during the steady-state operation of the seal assembly.

10. The turbine of claim 9, wherein the turbine is selected from a group consisting of: a steam turbine and a gas turbine.

11. The turbine of claim 10, wherein the first non-steady-state operation includes one of shut-down or temperature increasing and shut-down or temperature decreasing and the second non-steady-state operation of the seal assembly includes one of the other of shut-down or temperature increasing and shut-down or temperature decreasing.

12. The turbine of claim 9, wherein the rotating component includes a plurality of radially extending buckets, each bucket including the seal tooth mating surface or the received seal tooth thereon.

13. The turbine of claim 9, wherein the stationary component includes a plurality of radially extending nozzles, each nozzle including the seal tooth mating surface or the seal tooth thereon.

14. The turbine of claim 9, wherein the stationary component includes a plurality of radially extending end packing rings, each end packing ring including the seal tooth mating surface or the seal tooth thereon.

15. The turbine of claim 9, wherein the received seal tooth is annularly coupled to the one of the stationary component and the rotating component.

16. The turbine of claim 9, wherein the plateau portion is configured to receive the received seal tooth during the steady-state operation with a clearance of between about 0.127 cm and about 1.270 cm.

17. A seal assembly for sealing a stationary component and a rotating component, the seal assembly comprising:

a seal tooth mating surface for mating with a seal tooth, the seal tooth mating surface including:

a plateau portion for sealingly receiving the seal tooth during a steady-state operation of the seal assembly and a first concave portion adjacent to the plateau portion for receiving the seal tooth with a clearance during a first non-steady-state operation of the seal assembly, wherein the seal tooth is coupled to one of the stationary component and the rotating component and the seal tooth mating surface is coupled to the other of the stationary component and the rotating component; and a second concave portion adjacent to the plateau portion opposite the first concave portion, the second concave portion for receiving the seal tooth with a clearance during a second non-steady-state operation of the seal assembly, wherein the clearance during the first and the second non-steady state operations is a range of 0.381 cm to 2.032 cm.

* * * * *